US006630884B1

(12) United States Patent
Shanmugham

(10) Patent No.: US 6,630,884 B1
(45) Date of Patent: Oct. 7, 2003

(54) SURVEILLANCE SYSTEM FOR VEHICLES THAT CAPTURES VISUAL OR AUDIO DATA

(75) Inventor: Varudiyam P. Shanmugham, Hanover Park, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 450 days.

(21) Appl. No.: 09/664,124

(22) Filed: Jun. 12, 2000

(51) Int. Cl.[7] .................................................. B60Q 1/00

(52) U.S. Cl. ....................... 340/436; 340/903; 340/937; 340/438

(58) Field of Search ................................ 340/436, 903, 340/933, 937, 435, 500, 938, 438; 701/28, 29, 35; 307/9.1, 10.1

(56) References Cited

U.S. PATENT DOCUMENTS

| | | | | | |
|---|---|---|---|---|---|
| 4,816,828 | A | | 3/1989 | Feher | 340/945 |
| 5,262,813 | A | * | 11/1993 | Scharton | 354/266 |
| 5,689,442 | A | * | 11/1997 | Swanson et al. | 380/241 |
| 5,742,336 | A | | 4/1998 | Lee | 348/144 |
| 5,815,093 | A | * | 9/1998 | Kikinis | 340/937 |
| 5,990,934 | A | | 11/1999 | Nalwa | 348/36 |
| 6,088,635 | A | * | 7/2000 | Cox et al. | 701/19 |
| 6,141,611 | A | * | 10/2000 | Mackey et al. | 701/35 |
| 6,163,338 | A | * | 12/2000 | Johnson et al. | 348/148 |
| 6,246,933 | B1 | * | 6/2001 | Bague | 701/35 |
| 6,298,290 | B1 | * | 10/2001 | Abe et al. | 701/35 |

OTHER PUBLICATIONS

"Shipping Monitor" NASA Spinoff 2000, p. 42.

* cited by examiner

*Primary Examiner*—Toan Pham

(57) ABSTRACT

A surveillance system is mounted to a vehicle to record visual or audio data of areas in and around the vehicle. In the event of an impact on the vehicle, a sensor determines the level of impact (202). If the level of impact is of a predetermined force, then the sensor activates a cut-off timer to stop the recorder from recording a predetermined time after the impact (204). If there are multiple impacts on the vehicle of at least the predetermined force, then the cut-off timer is reset to add time to the predetermined time based on the number of impacts of the predetermined force (206, 208).

28 Claims, 2 Drawing Sheets

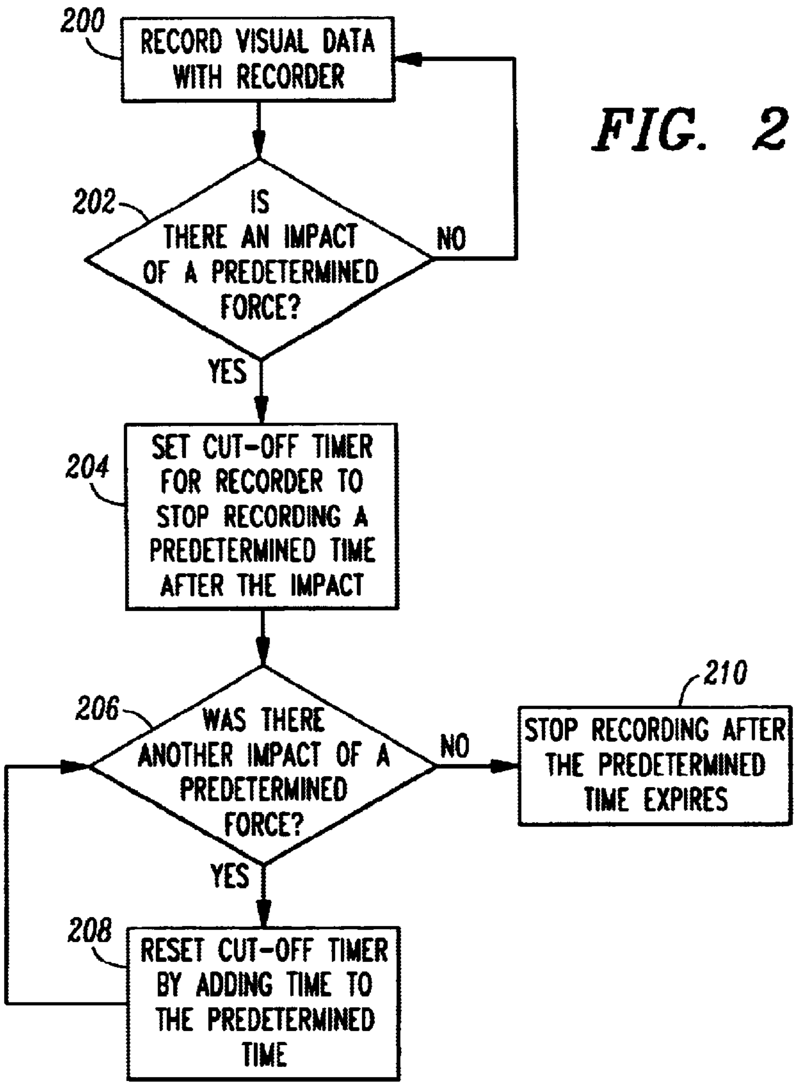
*FIG. 2*
*FIG. 3*
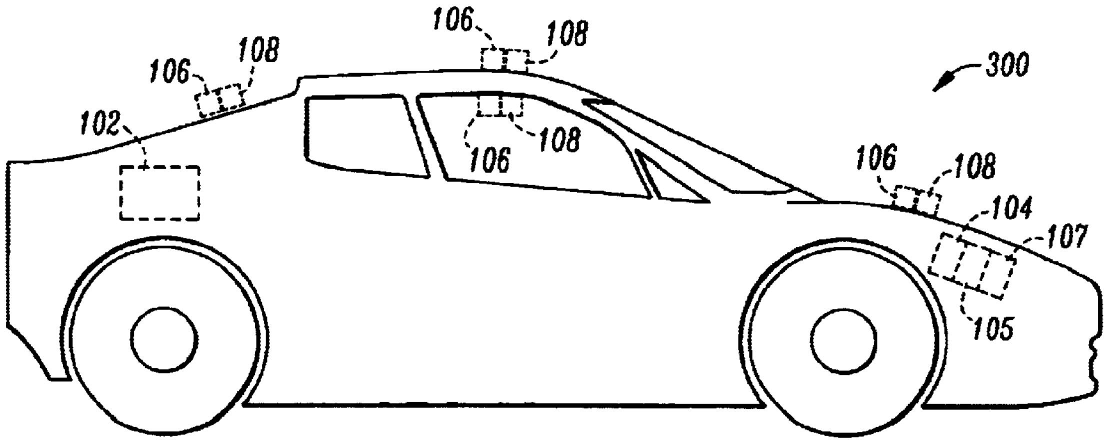

SURVEILLANCE SYSTEM FOR VEHICLES THAT CAPTURES VISUAL OR AUDIO DATA

FIELD OF THE INVENTION

The present invention relates generally to safety and surveillance equipment for vehicles, and in particular, to a surveillance system that records visual or audio data before an impact on a vehicle and beyond the time of the impact.

BACKGROUND OF THE INVENTION

Safety and surveillance equipment is used on vehicles to collect data that is of particular interest, including audio and video data. For example, safety and surveillance equipment is used on commercial aircraft to collect flight data prior to any catastrophic event that the aircraft may experience. The safety and surveillance equipment presently used on aircrafts to capture flight data include a flight data recorder (FDR) that records the operating conditions of the aircraft and the cockpit voice recorder (CVR) that records all sounds in the cockpit of the aircraft.

In addition to the FDR and the CVR, it is proposed that some aircraft include a flight video data recorder (FVDR) that records visual data from a flight. As disclosed in Feher, U.S. Pat. No. 4,816,828, visual images of a flight are recorded in the same manner as operating and audio data are recorded with the FDR and the CVR, respectively. However, unlike the FDR and the CVR, commercial aircraft are not required to carry flight video data recorders. Thus, in the aircraft industry, the use of video recorders to collect crash data is not widespread.

Although recorders are used on aircraft, this type of safety and surveillance equipment is not used on ground vehicles such as automobiles. This is in spite of the fact that the annual number of car crashes and resulting fatalities greatly exceed the annual number of airplane crashes. For instance, in 1996, three hundred and eighty people died in air crashes on commercial carriers according to the 1999 New York Times Almanac. Meanwhile, the number of people who died in automobile accidents in 1996 was 41,907, which constituted ninety-four percent of all transportation fatalities in that year. Moreover, another 3.5 million people were injured in automobile accidents. The annual number of automobile accidents, injuries and fatalities has not changed much since 1970 despite the safety improvements to the production of automobiles, wider highway lanes, better lighting, and lower speed limits.

In light of the benefits surveillance systems provide in investigating aircraft crashes and the relatively large number of automobile crashes, a need exist for a vehicle surveillance system for use in capturing data surrounding motor vehicle crashes.

SUMMARY OF THE INVENTION

In summary, a surveillance system is provided for capturing visual data of a vehicle. The surveillance system includes at least one camera mounted on a vehicle. Preferably, the camera is a panoramic viewing camera. The camera is placed to capture internal and external images of the vehicle. Additionally, the camera captures the areas surrounding the vehicle. A recorder is coupled to the camera to record the captured images from the camera. Alternatively, the recorder transmits the images to a receiver for viewing at a location remote from the vehicle. If an impact occurs on the vehicle, a sensor determines whether the impact is of a predetermined force. If the impact is of the predetermined force, then the sensor activates a cut-off timer that causes the recorder to stop recording after a predetermined time. If there are additional impacts to the vehicle of a predetermined force, then the cut-off timer is reset to add recording time based on the number of impacts. For example, a single impact allows for five seconds of additional recording time after the impact, and a second impact increases the recording time by five more seconds, and so on. When the predetermined time expires, the recorder powers off. As an alternative to, or in addition to capturing visual data, audio data is captured using a microphone and recorded by the recorder. Advantageously, this enables the recording of visual and/or audio data before and after impacts on the vehicle, giving a full before and after account of an incident.

BRIEF DESCRIPTION OF THE DRAWINGS

FIG. 2 is a flow chart illustrating a method to record video and audio data of a vehicle in accordance with the present invention.

FIG. 3 is an illustration of a vehicle with a surveillance system in accordance with the present invention.

DETAILED DESCRIPTION OF THE PREFERRED EMBODIMENTS

Figure 1:
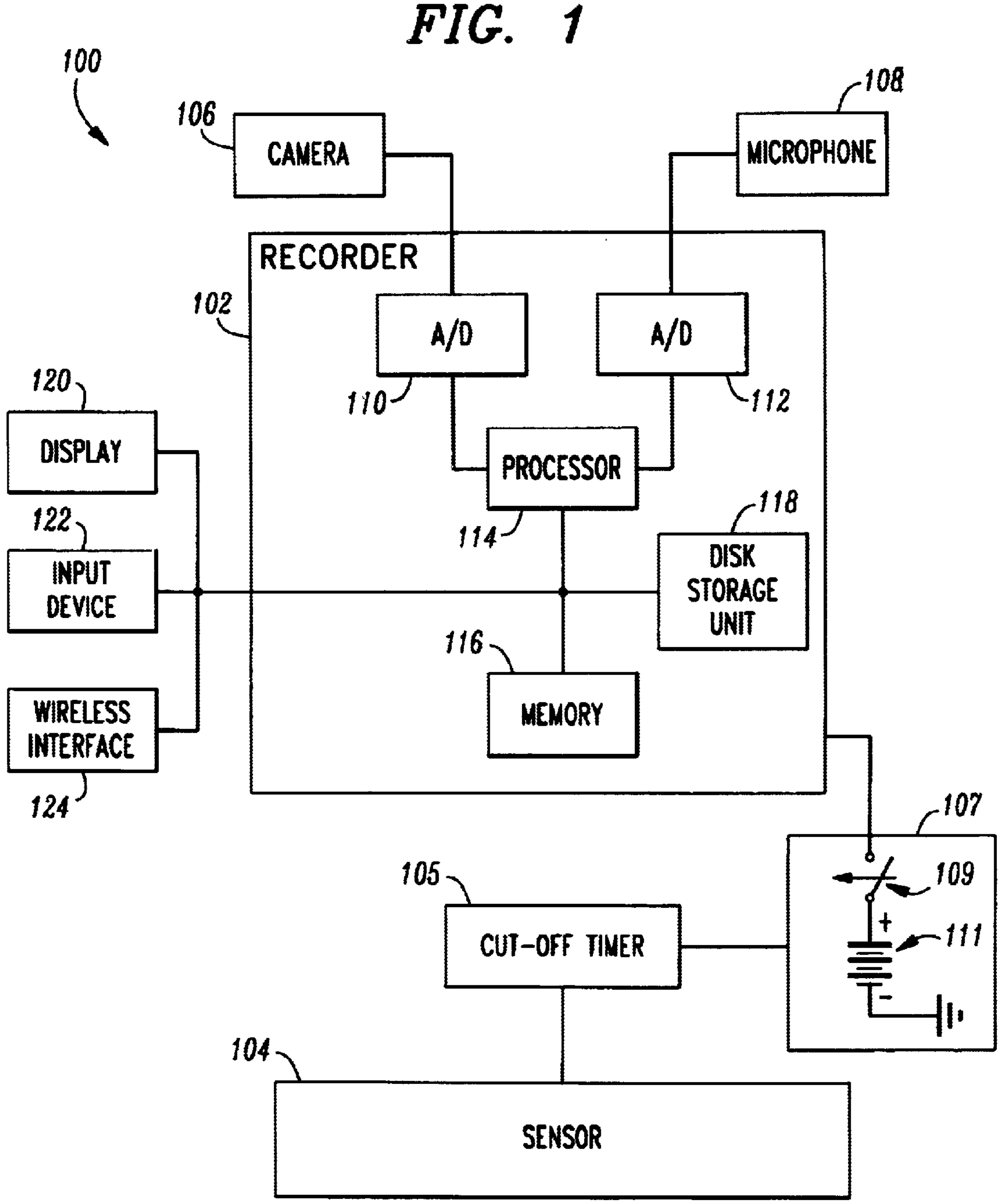
FIG. 1 is a block diagram of a preferred embodiment of a surveillance system for vehicles in accordance with the present invention.

FIG. 1 is a block diagram of a surveillance system 100. System 100 includes recorder 102, sensor 104, camera 106, microphone 108, cut-off timer 105 and power source 107. Camera 106 captures views of images in and around a vehicle. Recorder 102 is coupled to camera 106 to receive and record images from camera 106. Camera 106 is preferably a panoramic viewing camera. Most preferably, camera 106 is a FULLCIRCLE™ 360° camera from Lucent Technologies, Murray Hill, New Jersey. Recorder 102 is also coupled to microphone 108 to receive and record sound received from microphone 108. Microphone 108 is any suitable microphone for capturing sound.

Recorder 102 records and stores video and sound data. Preferably, recorder 102 continuously records video and sound data in a memory of a predetermined size, with the memory being rewritten periodically in a manner that is analogous to recording on a continuos loop tape. Recorder 102 preferably begins recording when the vehicle is powered or turned on. Recorder 102 is turned off to stop recording in the event of an impact, as discussed below.

Recorder 102 preferably includes analog-to-digital converters (A/D) 110 and 112, processor 114, memory 116, and disk storage unit 118. The video signals of images captured by camera 106 are received by AID 110. A/D 110 converts the video signals from analog data to digital video data. Though A/D 110 is shown as a single block, AND 110 is alternatively, multiple blocks that input and output portions of an entire video image. Memory 116 is coupled to processor 114 to store the digital video data received from A/D 110. AND 112 converts the audio signals received from microphone 108 from analog data to digital audio data. The digital audio data is stored in memory 116. Alternatively, the digital video data and the digital audio data are stored on disk storage unit 118. Processor 114 is preferably a microprocessor or digital signal processor. Memory 116 is any suitable volatile or non-volatile memory. Disk storage unit 118 is preferably a hard disk drive capable of storing four to five minutes of video and audio data.

Recorder 102 preferably includes a display 120, an input device 122 and a wireless interface 124. Display 120 is coupled to processor 114 for displaying the digital video data with the digital audio sound. Preferably, display 120 is located on the dashboard of the vehicle. Wireless interface 124 is coupled to processor 114 to optionally transmit digital audio and video data to a remote receiver such as a radio base station. User input device 122, is coupled to processor 114 to allow a user to control recorder 102. Preferably, user input device 122 includes a keyboard. The display and user input device are useful for viewing captured audio and video data, but preferably do not permit a user to interfere with the video and audio data in a manner that comprises the integrity of the data. One exemplary use of the display and input device is for a law enforcement officer to review video and audio data at the scene of an accident to dispense citations to the liable persons.

Sensor 104 detects an impact on a vehicle of a predetermined force. Cut-off timer 105 is coupled to sensor 104 to enable recorder 102 to stop recording video signals from the camera a predetermined time after sensor 102 detects an impact on the vehicle of a predetermined force. More specifically, power source 107 provides power to recorder 102 for recording and cut-off timer 105 controls power source 107 to power off recorder 102 after the predetermined time has expired.

Preferably, sensor 104 is an MB ACCELEROMETER sensor available from Impact Register, Inc., Largo, Florida. Most preferably, sensor 104 senses an impact of plus or minus from 3G (gravity) to 50G. Cut-off timer 105 is any suitable timer that enables recorder 102 to stop recording after a predetermined time. Power source 107 preferably includes a switch 109 connected to the vehicle's battery 111, where the switch is controlled by the cut-off timer 105 to power off recorder 102 after the predetermined time expires.

FIG. 2 illustrates a method to record video and audio data in accordance with the present invention. FIG. 2 is described below with respect to the preferred embodiment shown in FIG. 1.

First, recorder 102 records visual and/or audio data received from camera 106 and microphone 108 (200). Then, there is a determination as to whether there is an impact on the vehicle of a predetermined force (202). This is accomplished in the preferred embodiment by sensor 104 detecting the level of impact, if any, on the vehicle. If the impact is not of the predetermined force, then the recorder continues to record data. If the impact is of the predetermined force, then a cut-off timer 105 is set such that recorder 102 stops recording a predetermined time after the impact (204). Then, a determination is made as to whether there is another impact on the vehicle of a predetermined force (206). If there is not another impact of the predetermined force, then recorder 102 stops recording after the predetermined time expires (210). If there is another impact of the predetermined force, then recorder 102 is reset by adding time to the predetermined time (208). Additional impacts may result from additional collisions, for example, collisions caused by a multiple vehicle crash. In a preferred embodiment, cut-off timer 105 is initially set such that recorder 102 is stopped after five seconds. Then, each subsequent impact of the predetermined force adds an additional five seconds of recording time. Preferably, a maximum number of impacts, for example, ten, is allowed to extend recording time. Beyond the maximum number of impacts no further recording time is permitted.

FIG. 3 illustrates a side view of a vehicle 300 employing a surveillance system in accordance with the present invention. The surveillance system components are shown schematically in phantom to illustrate a preferred placement. Cameras 106 and microphones 108 are mounted to the inside top of the vehicle, outside roof of the vehicle, hood of the vehicle, and trunk of the vehicle. Recorder 102 is mounted in the trunk of the vehicle. Most preferably, recorder 102 is mounted in a rugged housing that is made to withstand substantial impacts, adverse weather and other environmental conditions in order to preserve the recorded audio and visual data. Sensor 104, cut-off timer 105, and power source 107 are preferably mounted under the hood of the vehicle.

The present invention provides for the recording of visual and/or audio data of a vehicle during an automobile accident. The surveillance system senses an impact and continues to record visual or audio data for a predetermined time after the impact. Advantageously, this invention provides a more detailed account of the events before and after a car accident.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A surveillance system for vehicles comprising:

a sensor for mounting to the vehicle to detect an impact on the vehicle of a predetermined force;

at least one camera for mounting to the vehicle to produce video signals of images around the vehicle;

a recorder coupled to the at least one camera to record video signals received from the at least one camera;

a timer, coupled to the recorder, that activates the recorder to stop recording the video signals from the camera a predetermined time after the sensor detects impacts on the vehicle having the predetermined force; and a switch, coupled to the timer and the recorder, that powers off the recorder after the predetermined time has expired.

2. The system of claim 1 further comprising a microphone coupled to the recorder to transmit audio signals to the recorder.

3. The system of claim 1 wherein the vehicle is an automobile.

4. The system of claim 1 wherein the at least one camera is a panoramic viewing camera.

5. The system of claim 1 wherein the recorder comprises:

a first analog-toigital converter that converts the video signals from analog data to digital video data and a second analog-to-digital converter that converts the audio signals from analog data to digital audio data; and a memory that stores at least one of digital video data and digital audio data.

6. The system of claim 5 wherein the recorder further comprises a disk storage unit for storing the digital video data.

7. The system of claim 5 wherein the recorder further comprises a display for viewing the video images.

8. The system of claim 5 further comprising a user input device coupled to the recorder.

9. The system of claim 8 wherein the user input device is a keyboard.

10. The system of claim 5 wherein the recorder further comprises a wireless interface to transmit the digital video data and the digital audio data to a remote receiver.

11. A method for recording data in a surveillance system for vehicles, the method comprising:

A) recording visual data from at least one camera by a recorder;

B) detecting a first impact on a vehicle of predetermined force;

C) enabling the recorder to stop recording a first predetermined time after the first impact of predetermined force;

D) detecting a second impact on the vehicle of predetermined force;

B) enabling the recorder to stop recording a second predetermined time after the second impact of predetermined force; and F) powering off the recorder after expiration of one of the first and the second predetermined times.

12. The method of claim 11 wherein the vehicle is an automobile.

13. The method of claim 11 wherein detection of a second impact on the vehicle of predetermined force extends recorder operation beyond the first predetermined time.

14. The method of claim 11 wherein the at least one camera is a panoramic viewing camera.

15. The method of claim 11 further comprises transmitting the visual data via a wireless interface to a remote receiver.

16. A surveillance system for vehicles comprising:

a sensor for mounting to the vehicle to detect an impact on the vehicle of a predetermined force;

at least one microphone for mounting to the vehicle to produce audio signals of sounds around the vehicle;

a recorder coupled to the at least one microphone to record audio signals received from the at least one microphone;

a timer, coupled to the recorder, that activates the recorder to stop recording the audio signals from the microphone a predetermined time after the sensor detects impacts on the vehicle having the predetermined force; and a switch, coupled to the recorder, that powers off the recorder after the predetermined time has expired.

17. The system of claim 16 further comprising at least one camera coupled to the recorder to transmit video signals to the recorder.

18. The system of claim 17 wherein the at least one camera is a panoramic viewing camera.

19. The system of claim 16 wherein the vehicle is an automobile.

20. The system of claim 16 wherein the recorder comprises:

a first analog-to-digital converter that converts the video signals from analog data to digital video data and a second analog-to-digital converter that converts the audio signals from analog data to digital audio data; and a memory that stores one of the digital video data and the digital audio data.

21. The system of claim 20 wherein the recorder further comprises a disk storage unit for storing one of the digital video data and the digital audio data.

22. The system of claim 20 wherein the recorder further comprises a display for viewing the video images.

23. The system of claim 20 further comprising a user input device coupled to the recorder.

24. The system of claim 20 wherein the recorder further comprises a wireless interface to transmit the digital video data and the digital audio data to a remote receiver.

25. A method for recording data in a surveillance system for vehicles, the method comprising:

A) recording audio data from a microphone by a recorder;

B) detecting a first impact on a vehicle of predetermined force;

C) enabling the recorder to stop recording a first predetermined time after the first impact of predetermined force;

D) detecting a second impact of predetermined force;

E) enabling the recorder to stop recording a second predetermined time after the second impact; and F) powering off the recorder after expiration of one of the first and the second predetermined times.

26. The method of claim 25 wherein the vehicle is an automobile.

27. The method of claim 25 wherein detection of a second impact on the vehicle of predetermined force extends recorder operation beyond the first predetermined time.

28. The method of claim 25 further comprises transmitting the audio data via a wireless interface to a remote receiver.

* * * * *